US012801383B2

(12) United States Patent
Bao et al.

(10) Patent No.: US 12,801,383 B2
(45) Date of Patent: Nov. 17, 2026

(54) CONTROL METHOD AND CHIP

(71) Applicant: Smarter Silicon (Shanghai) Technologies Co., Ltd., Shanghai (CN)

(72) Inventors: Xinghai Bao, Shanghai (CN); Jianguo Wu, Shanghai (CN); Zheng Wang, Shanghai (CN)

(73) Assignee: Smarter Silicon (Shanghai) Technologies Co., Ltd., Shanghai (CN)

( * ) Notice: Subject to any disclaimer, the term of this patent is extended or adjusted under 35 U.S.C. 154(b) by 59 days.

(21) Appl. No.: 18/408,047

(22) Filed: Jan. 9, 2024

(65) Prior Publication Data

US 2024/0231822 A1 Jul. 11, 2024

(30) Foreign Application Priority Data

Jan. 10, 2023 (CN) ........................ 202310037863.5

(51) Int. Cl.
*G06F 9/38* (2018.01)
*G06F 9/30* (2018.01)

(52) U.S. Cl.
CPC ...... *G06F 9/30036* (2013.01); *G06F 9/30043* (2013.01); *G06F 9/30101* (2013.01); *G06F 9/30167* (2013.01)

(58) Field of Classification Search
None
See application file for complete search history.

(56) References Cited

U.S. PATENT DOCUMENTS 7,003,543 B2 * 2/2006 Elliott ........................ G06F 7/57
708/525
8,370,663 B2 * 2/2013 Frid ....................... G06F 1/3203
713/323
10,725,525 B2 * 7/2020 Park ....................... G06F 1/3296
11,126,433 B2 * 9/2021 Burger ....................... G06F 9/35
11,971,769 B2 * 4/2024 Lee ........................ G06F 1/3296
2002/0042887 A1 * 4/2002 Chauvel ................ G06F 9/4893
713/300
2002/0055961 A1 * 5/2002 Chauvel .............. G06F 12/0879
712/E9.033
2006/0179329 A1 * 8/2006 Terechko ............ G06F 9/30083
712/E9.032
2008/0082800 A1 * 4/2008 Matsuo ................... G06F 9/382
712/E9.035
2009/0049314 A1 * 2/2009 Taha ..................... G06F 1/3296
713/300
2009/0204830 A1 * 8/2009 Frid ....................... G06F 1/3203
713/322
2014/0068285 A1 * 3/2014 Lee ........................ G06F 1/3203
713/300

(Continued)

OTHER PUBLICATIONS

Kriaa et al, "Low Power oriented Hardware dependent Software Implementation in MPSoC Architectures", 2007 (Year: 2007).*

*Primary Examiner* — Hyun Nam
(74) *Attorney, Agent, or Firm* — ANOVA LAW GROUP, PLLC

(57) ABSTRACT

A chip includes a processing module and a first control module. The processing module is configured to determine a target operation status of the chip based on status information of the chip. The first control module is configured to control the operation status of the chip based on a predetermined scenario template corresponding to the target operation status.

16 Claims, 10 Drawing Sheets

(56) References Cited

U.S. PATENT DOCUMENTS

| | | | | |
|---|---|---|---|---|
| 2017/0083321 | A1* | 3/2017 | Burger | G06F 12/1009 |
| 2018/0348838 | A1* | 12/2018 | Cox | G06F 1/324 |
| 2020/0272553 | A1* | 8/2020 | Miloiu | G06F 11/3698 |
| 2023/0305978 | A1* | 9/2023 | Davis | G06F 13/4022 |
| 2024/0231822 | A1* | 7/2024 | Bao | G06F 9/30101 |

* cited by examiner

| Opcode | Data index | Delay time |
|---|---|---|
| RegWrite | 100 | DELAY0 |
| RegWrite | 101 | DELAY1 |
| RegWrite | 102 | DELAY2 |
| RegWrite | 103 | DELAY3 |
| NOP | NC | DELAY4 |
| SPI | 320 | DELAY5 |
| SPI | 321 | DELAY6 |
| SPI | 322 | DELAY7 |
| NOP | NC | DELAY8 |
| SPI | 340 | DELAY9 |
| SPI | 341 | DELAY10 |
| SPI | 342 | DELAY11 |
| NOP | NC | DELAY12 |
| INT | NC | DELAY13 |
| END | NC | DELAY14 |

CONTROL METHOD AND CHIP

CROSS-REFERENCE TO RELATED APPLICATION

The present disclosure claims priority to Chinese Patent Application No. 202310037863.5, filed on Jan. 10, 2023, the entire content of which is incorporated herein by reference.

TECHNICAL FIELD

The present disclosure relates to the electronic device technology field and, more particularly, to a control method and a chip.

BACKGROUND

In the related technology, an operation instruction is configured by software in a processor, and a chip of an electronic device is controlled through the operation instruction. However, the software needs to be involved in configuring each operation instruction, and the execution status of the configured operation instruction needs to be continuously monitored, which increases the load of the processor.

SUMMARY

An aspect of the present disclosure provides a chip, including a processing module and a first control module. The processing module is configured to determine a target operation status of the chip based on status information of the chip. The first control module is configured to control the operation status of the chip based on a predetermined scenario template corresponding to the target operation status.

An aspect of the present disclosure provides a control method applied to a chip. The method includes determining a target operation status of the chip based on status information of the chip and controlling the operation status of the chip based on a predetermined scenario template corresponding to the target operation status.

An aspect of the present disclosure provides an electronic device, including a processor and a memory. The memory stores a computer program that, when executed by the processor, causes the processor to determine a target operation status of the chip based on status information of the chip and control the operation status of the chip based on a predetermined scenario template corresponding to the target operation status.

In embodiments of the present disclosure, the processing module is configured to determine the target operation status of the chip based on the status information of the chip. The first control module is configured to control the operation status of the chip based on the predetermined scenario template corresponding to the target operation status. Thus, the processing module does not need to be involved in the process of executing the operation instruction in the scenario template. As a result, the load of the processing module can be offloaded to allow available computational resources of the processing module to concurrently participate in other related software tasks.

DETAILED DESCRIPTION OF THE EMBODIMENTS

To make the purpose, the technical solution, and the advantage of the present disclosure clearer, the technical solution of embodiments of the present disclosure is described in detail in connection with the accompanying drawings of embodiments of the present disclosure. Described embodiments are merely some embodiments of the present disclosure, not all embodiments. The following embodiments are used to describe the present disclosure not limit the scope of the present disclosure. Based on embodiments of the present disclosure, all other embodiments obtained by those ordinary skills in the art without creative effort should be within the scope of the present disclosure.

In the following description, the term "some embodiments" refers to a subset of all possible embodiments, but "some embodiments" can refer to the same subset or different subsets of all possible embodiments and can be combined when there is no conflict.

The terms "first/second/third" used in embodiments of the present disclosure are only used to distinguish similar objects and do not represent a specific order for the objects. "First/second/third" can be interchangeable in a different order or sequence as allowed to implement embodiments of the present disclosure in a different sequence than the sequence illustrated or described here.

Those skilled in the art can understand that, unless otherwise defined, all the terms used here (including technical and scientific terms) have the same meaning as understood by those skilled in the art in the relevant field of the present disclosure. The terms such as those defined in a general dictionary should be interpreted to have the same meaning as in the context of the existing technology and should not be understood as idealized or overly formal meanings unless specifically defined.

In the use of consumer electronic devices, such as mobile phones, tablets, etc., the electronic devices can be controlled in a dynamic voltage and frequency scaling (DVFS) technology to save power. In the control process, temperature and load information of chips and circuit boards of the electronic devices may need to be collected. Then, a result can be determined through an algorithm to form a decision. Then, the frequency adjustment can be performed by a phase-locked loop (PLL), and the voltage adjustment can be performed by configuring an external power management IC (PMIC) through a serial bus. For a multi-core system, the functions of algorithm decision-making and actual execution configuration are often deployed on different processors (CPUs). Thus, inter-core communication (Mailbox) may also be needed to control the electronic devices. As such, the path from the decision to the configuration and time consumed can be long, and the software control can be complex.

Figure 1:
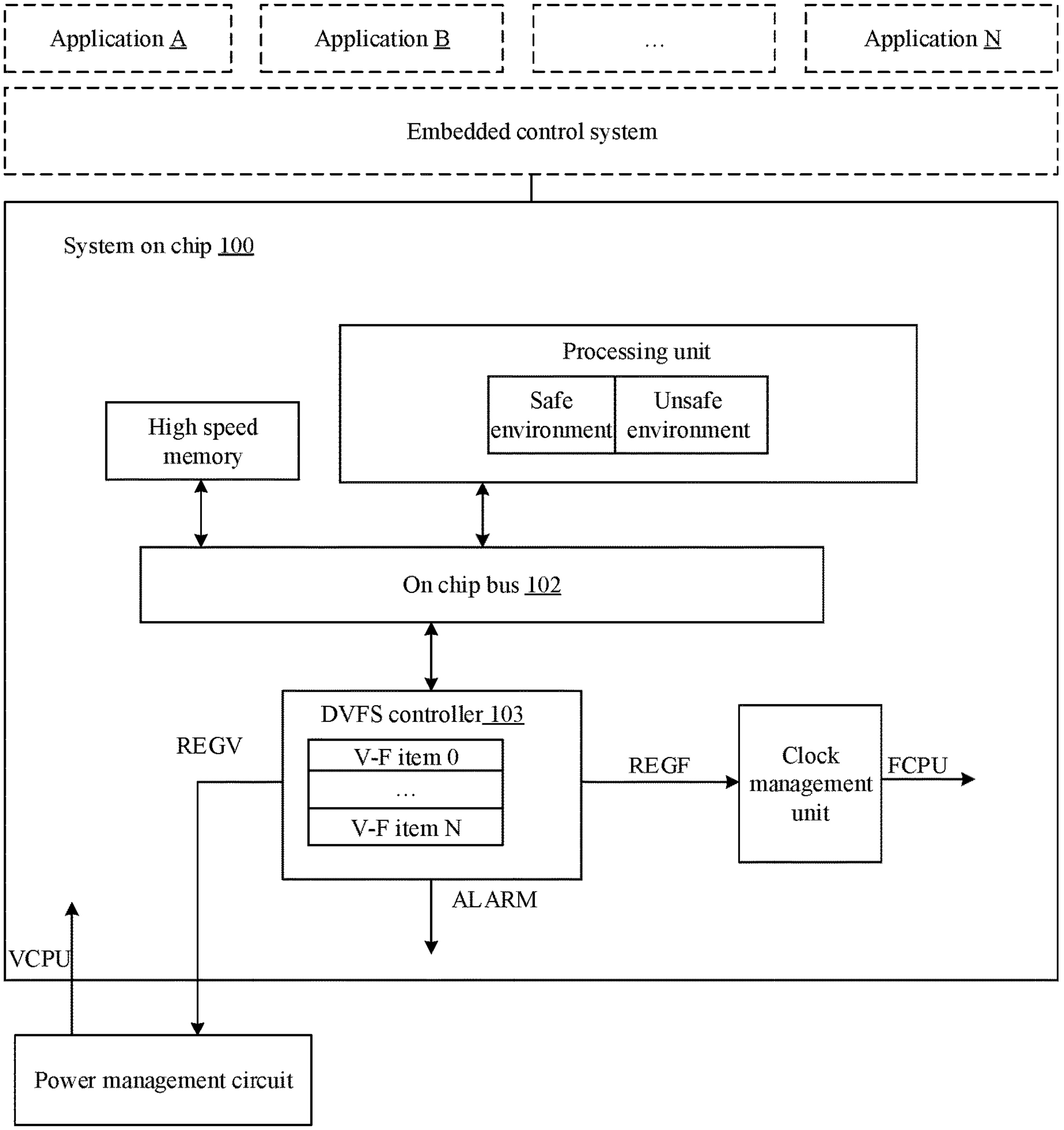
FIG. 1 illustrates a schematic structural diagram of a chip in the related technology.

To address the above problems, as shown in FIG. 1, in some related technologies, (1) a DVFS controller 103 in a system on chip (SoC) 100 is implemented by hardware. A frequency configuration instruction can be generated through a reception processing unit of an on-chip bus 102, i.e., at least one frequency-voltage pair and frequency and voltage adjustment instructions. (2) The DVFS controller 103 reads and stores the frequency-voltage pairs to form a frequency-voltage table. (3) The DVFS controller 103 compares the target frequency with each frequency-voltage pair in the frequency-voltage table to extract the corresponding voltage and frequency. (4) The DVFS controller 103 can generate and send a voltage adjustment signal and a frequency adjustment signal that match to a corresponding circuit according to the corresponding voltage and frequency.

Figure 2:
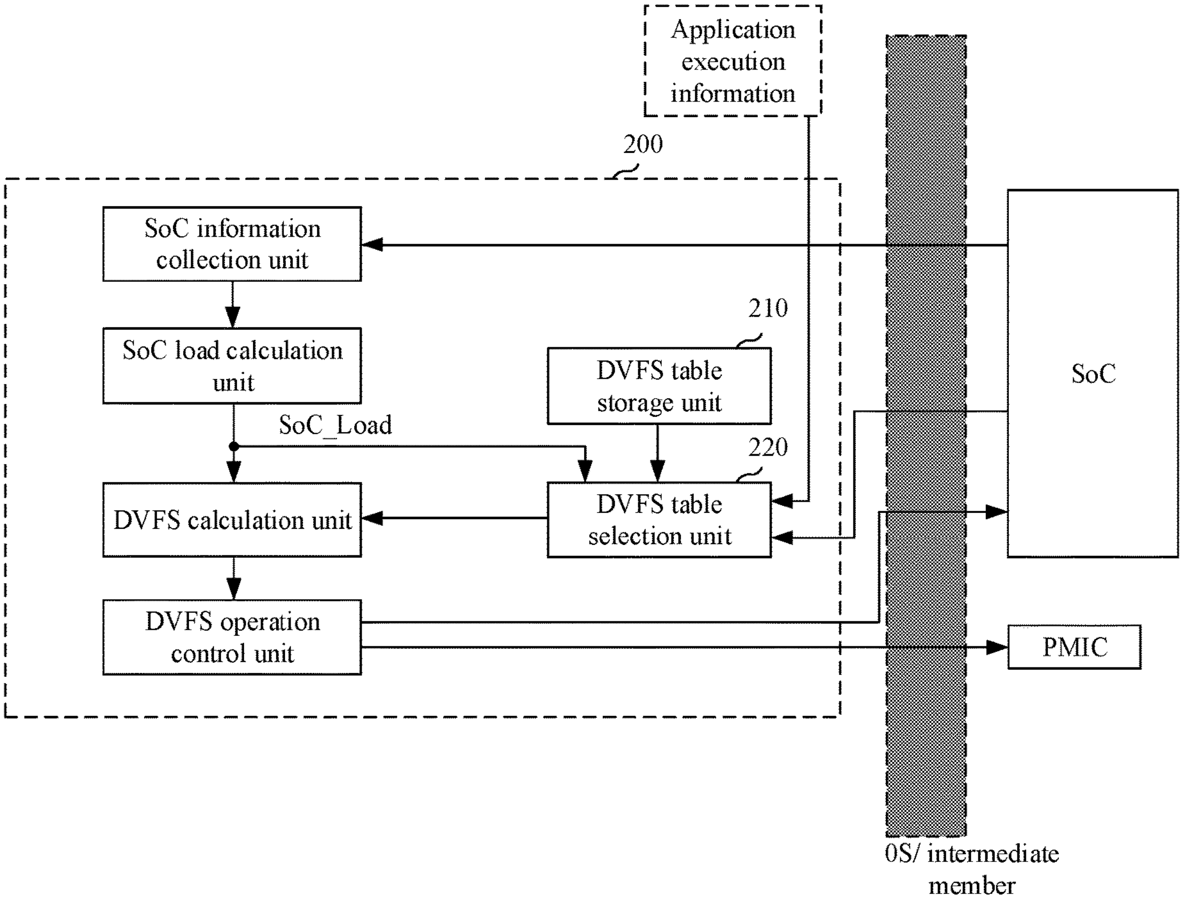
FIG. 2 illustrates a schematic structural diagram of a chip in the related technology.

As shown in FIG. 2, in some related technologies, the DVFS control with software and hardware combination is realized by combining a DVFS control chip 200 and a DVFS software algorithm. 1) The RAM of the DVFS control chip 200 stores a DVFS table and operation instructions that are configured after testing. (2) The software can calculate the control strategy through the external parameter and determine the corresponding control data by searching the table in the DVFS control chip and through a DVFS table selection unit 210 and a DVFS table storage unit 220. (3) The software configures instructions to the DVFS control chip 200 through the control strategy, where the instruction data is from the data of the matched Table. (4) The DVFS control chip 200 automatically converts instructions into actions configured in the register or a configuration time sequence of the serial bus and controls the device through the bus. However, in the above method, the process of configuring the operation instruction through the software is complex. The software needs to be involved for each operation instruction, which increases the load of the processor, and the execution status of the configured operation instruction needs to be monitored continuously.

Figure 3A:
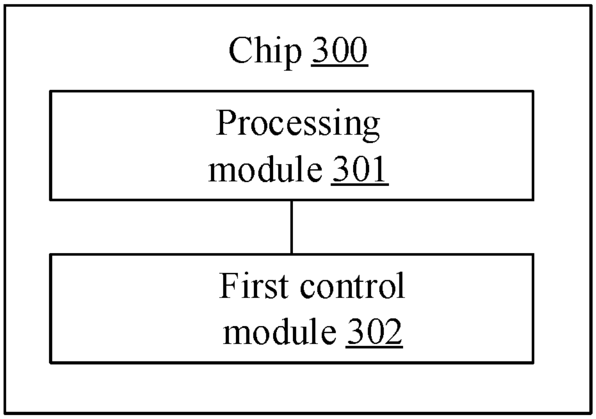
FIG. 3A illustrates a schematic structural diagram of a chip according to some embodiments of the present disclosure.

To address the above problems, embodiments of the present disclosure provide a chip. FIG. 3A illustrates a schematic structural diagram of the chip 300 according to some embodiments of the present disclosure. The chip 300 includes a processing module 301 and a first control module 302. The processing module 301 can be configured to determine a target operation status of the chip based on the status information of the chip. The first control module 302 can be configured to control the operation status of the chip based on a predetermined scenario template corresponding to the target operation status.

In embodiments of the present disclosure, the chip 300 can be a system-level chip, such as a system on chip (SoC), including a circuit board, a bus, and a functional module (hardware). The bus and the functional module are arranged on the circuit board. The processing module 301 and the first control module 302 can be hardware functional modules, which can be independent chips or integrated into a single chip entity.

In some embodiments, the processing module 301 can be a processor chip, such as a central processing unit (CPU). The first control module 302 can be a hardware entity, such as a controller chip. Unlike the processing module 301 and the first control module 302, the chip 300 can be the system-level chip that integrates at least one chip.

The predetermined scenario template in the first control module 302 can be stored in the storage unit of the first control module 302, in the storage unit of another module of the chip, or in the storage module of the chip, which is not limited here. Different modules of the chips can communicate with each other, for example, through the bus, to transfer data.

Figure 3B:
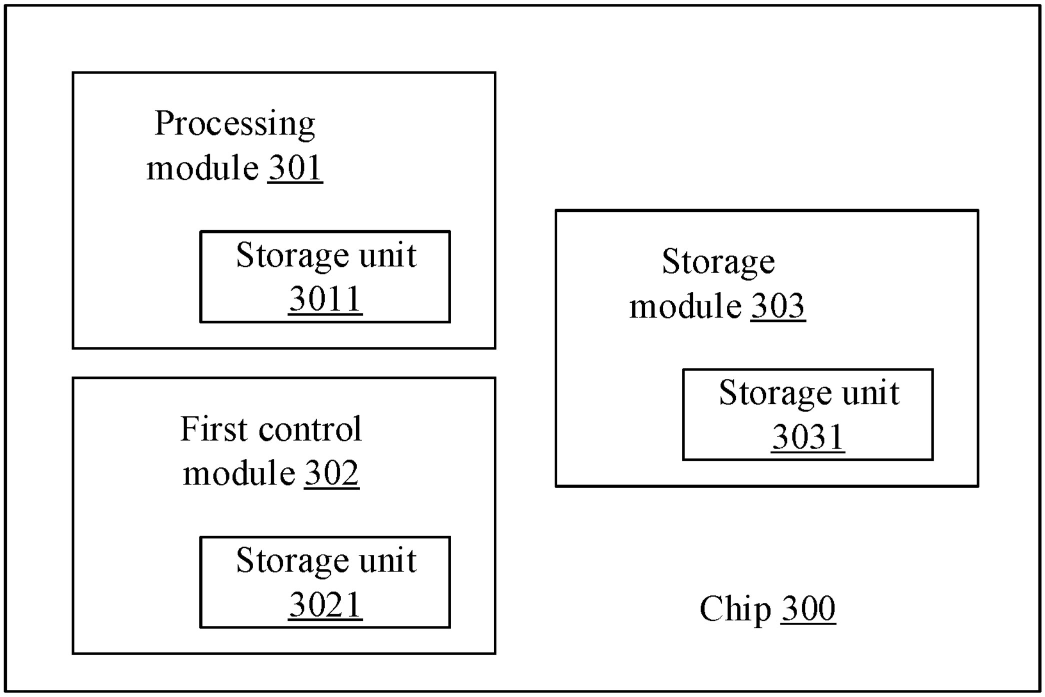
FIG. 3B illustrates a schematic structural diagram of a chip according to some embodiments of the present disclosure.

For example, as shown in FIG. 3B, in some embodiments, the processing module 301 includes a storage unit 3011, and the first control module 302 includes a storage unit 3021. The chip 300 further includes a storage module 303, and the storage module 303 includes a storage unit 3031. The predetermined scenario templates can be stored in any storage unit of the storage unit 3011, the storage unit 3021, or the storage unit 3031. Since the DVFS control process has a strict requirement for the time sequence of the signals, the scenario templates can be stored in the storage unit 3021 of the first control module 302 to reduce the transfer delay of performing the read/write operation on the scenario template data.

The predetermined scenario templates can be written into the chip during the power-on or the manufacturing process. The configuration time can be saved by preloading the scenario templates in different scenarios.

The status information can include information related to DVFS, including on-board information of the chip and environment information of the chip, for example, the temperature of the chip, the on-board information such as the current and voltage of the chip in the operation status, and the environment information of the chip such as the temperature of the internal space of the cell phone where the chip is located.

The target operation status can be the operation status when the load connected to the chip is at the target power consumption or the status in which the chip operates in a rated current or voltage. Thus, the target operation status can include a target operation frequency and a target operation voltage.

The predetermined scenario templates can include a control frequency or a control word of the control voltage. The frequency and voltage of the chip can be controlled through the predetermined scenario templates. When the target operation status has a target operation frequency and a target operation voltage, a scenario template can be selected from the predetermined scenario templates to adjust the frequency of the chip to the target operation frequency and the voltage of the chip to the target operation voltage.

For example, if the target operation frequency of the chip can be F0, and the target operation voltage of the chip can be V0. Scenario template 0 can be used to adjust the frequency of the chip to F0 and the voltage of the chip to V0. Scenario template 0 can be determined as the predetermined scenario template corresponding to the target operation status.

For example, when the scenario template of adjusting the frequency of the chip to F0 and adjusting the voltage of the chip to V0 is not stored in the predetermined scenario templates, a scenario template with similar voltage and frequency to V0 and F0 of the predetermined scenario templates can be modified. The modified scenario template can be determined as the predetermined template template corresponding to the target operation status.

In some embodiments, the processing module can be configured to determine the target operation status of the chip based on the status information of the chip. The first control module can be configured to control the operation status of the chip based on the predetermined scenario template corresponding to the target operation status. Thus, after the target operation status is determined through the calculation of the software in the processing module, the hardware entity of the first control module can be called to operate according to the predetermined scenario template corresponding to the target operation status. After the operation instruction of the scenario template is performed, the processing module can be notified. Thus, after the processing module calls the first control module to start performing the operation instruction and before receiving the notification of the completion of the instruction execution, the processing module may no longer need to participate in controlling the operation status of the chip. Thus, the calculation resource of the processing module can be released for other related software tasks.

Figure 4A:
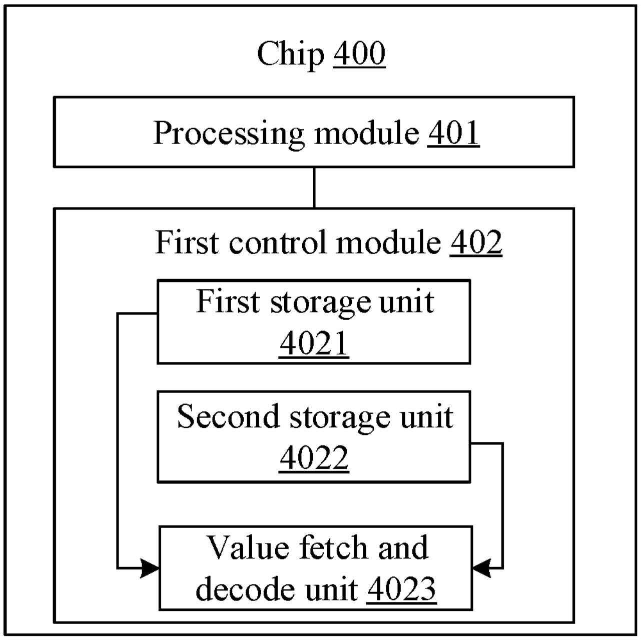
FIG. 4A illustrates a schematic structural diagram of a chip according to some embodiments of the present disclosure.

Embodiments of the present disclosure provide a chip. FIG. 4A illustrates a schematic structural diagram of the chip 400 according to some embodiments of the present disclosure. As shown in FIG. 4A, the chip 400 includes a processing module 401 and a first control module 402. The processing module 401 can be configured to determine the target operation status of the chip based on the status information of the chip. The first control module 402 includes a first storage unit 4021, a second storage unit 4022, and an instruction fetch and decode unit 4023.

The first storage unit 4021 can be configured to store the predetermined scenario template. The predetermined scenario template includes at least one operation instruction. The second storage unit 4022 can be configured to store a control word corresponding to the operation instruction. The first storage unit 4021 and the second storage unit 4022 can be two physically independent hardware storage units or two logically independent storage units in the same memory entity.

In some embodiments, each operation instruction can include an operation code and a data index corresponding to the operation code. Each data index can be used to represent the storage location of the control word of the to-be-controlled target in the second storage unit 4022. Each operation code can correspond to the control word of the to-be-controlled target and can be configured to configure the to-be-controlled target.

In some embodiments, each operation instruction can also include a delay time. The delay time can be a wait time between performing each operation instruction and performing a next operation instruction of the operation instruction.

Figure 7:
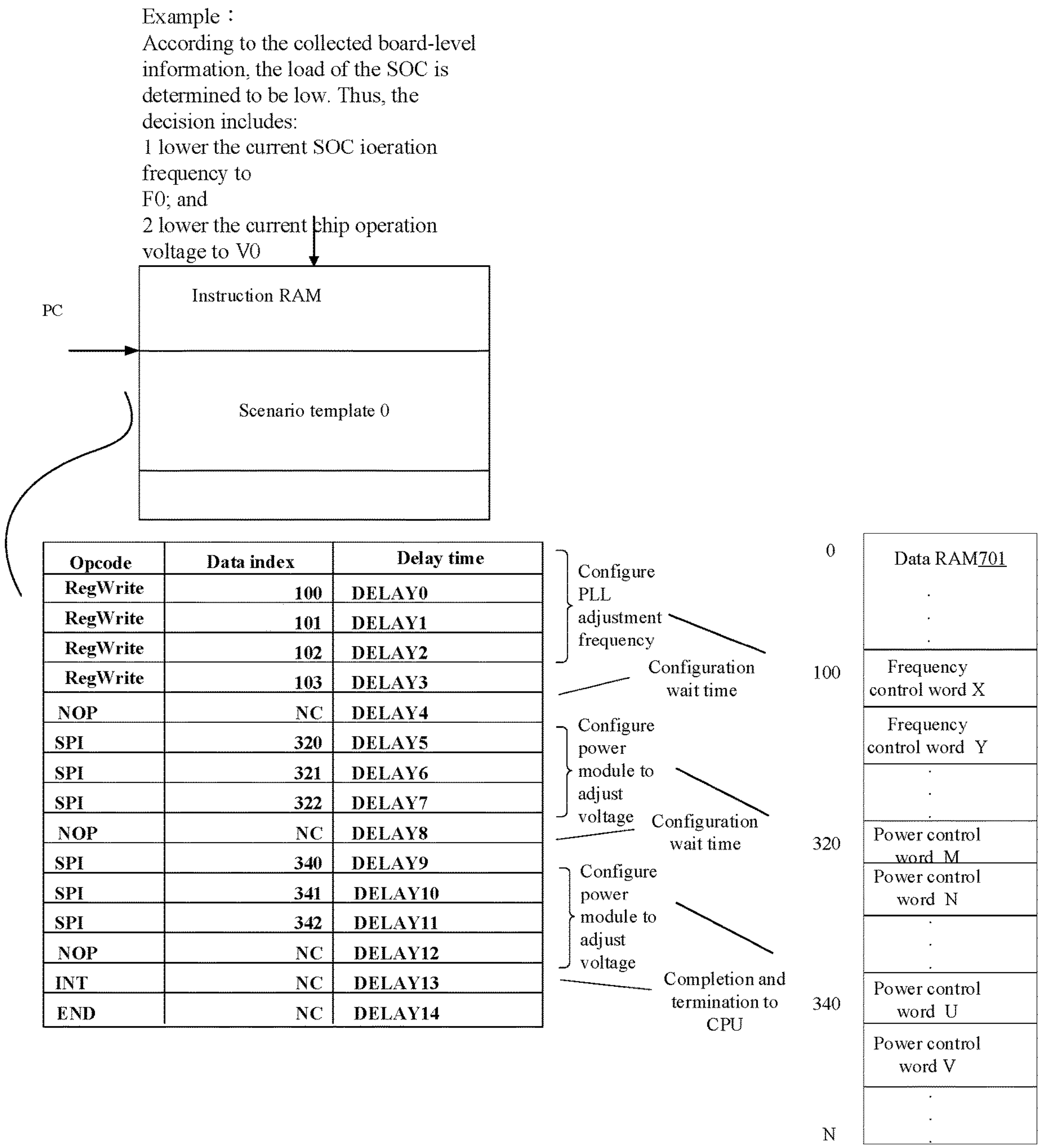
FIG. 7 illustrates a schematic diagram showing an application scene of a control method according to some embodiments of the present disclosure.

For example, in the scenario template shown in FIG. 7, one operation instruction includes operation codes such as register write (RegWrite), a data index 100, and a delay time DELAY0. The data index 100 represents the storage location 100 of the control word in the data RAM 701, where frequency control word X is stored at the storage location 100.

In some other embodiments, the predetermined scenario template can also include at least one of a wait instruction, an interrupt instruction, or a termination instruction. The wait instruction can be between different types of operation instructions and can be used to adjust the time sequence of the different types of operation instructions. The interrupt instruction can be after any one of the operation instructions and used to notify the processing module 401 that the operation instruction of the scenario template is performed. The termination instruction can be after the interrupt instruction and used to control the first control module 402 to stop performing the operation instruction of the scenario template. The wait instruction may not have the data index.

For example, in the scenario template shown in FIG. 7, a wait instruction NOP is between an operation code register write (RegWrite) and an operation code SPI. An interrupt instruction INT is after the operation code SPI. The last instruction in the scenario template can be a termination instruction END indicating that the operation instruction of the current scenario template is completed. When the operation code is the wait instruction NOP, and the data index is NC, the process of determining the control word from the second storage unit can be omitted, until after the delay time of the operation instruction, the next instruction can be continued to be performed.

The instruction fetch and decode unit 4023 can be configured to read the operation instruction from the first storage unit 4021 and read the control word from the second storage unit 4022. The operation status of the chip can be controlled based on the operation instruction and the control word.

In some embodiments, the instruction fetch and decode unit 4023 can be further configured to decode the operation code and the data index, determine the to-be-controlled target based on the decoded operation code, and determine the control word read from the second storage unit 4022 based on the decoded data index and the to-be-controlled target.

Figure 4B:
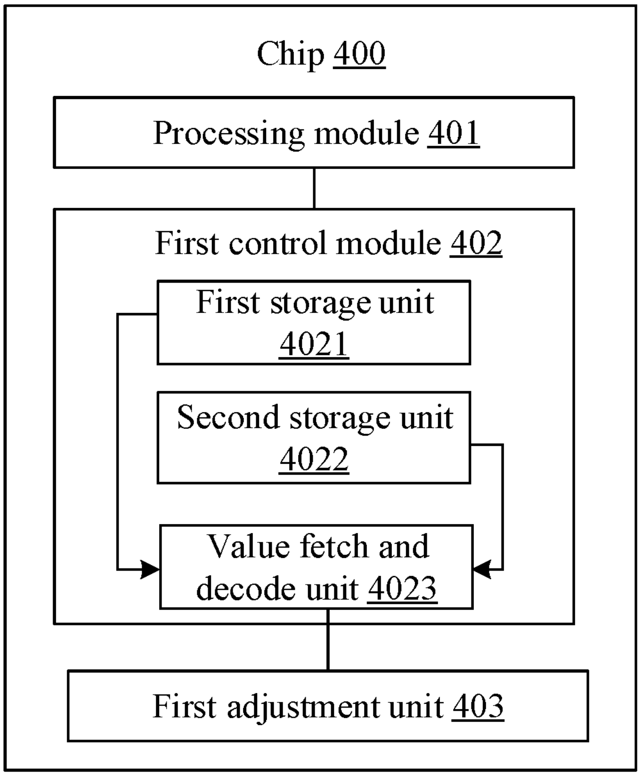
FIG. 4B illustrates a schematic structural diagram of a chip according to some embodiments of the present disclosure.

In some embodiments, as shown in FIG. 4B, the to-be-controlled target includes a first adjustment unit 403. The first adjustment unit 403 can be configured to receive the control word sent by the instruction fetch and decode unit 4023 and, based on the control word, control the operation status of the chip. The instruction fetch and decode unit 4023 can be further configured to send the control word to the first adjustment unit 403 when the to-be-controlled target is the first adjustment unit.

For example, the instruction fetch and decode unit 4023 can fetch an operation instruction from the first storage unit 4021. The instruction fetch and decode unit 4023 can decode high bits of the operation instruction into an operation code and decode low bits into a data index. Take the operation instruction 00100100 as an example, where the high bits 0010 of the operation instruction can be decoded into the operation code register write (RegWrite), and the low bits 0100 can be decoded into Index W. The frequency control word Y can be fetched from the storage location Index W of the second storage unit 4022 and sent to the first adjustment unit 403 corresponding to RegWrite, e.g., a phase-locked loop frequency management module. Then, the phase-locked loop frequency management module can adjust the frequency of the chip based on the frequency control word Y.

Here, the first adjustment unit 403, the processing module 401, and the first control module 402 can be integrated on the chip 400. For example, in embodiments shown in FIG. 5, the first adjustment unit 403 is a phase-locked loop frequency management module 503, and the first control module 402 is a DVFS controller 501. The phase-locked loop frequency management module 503, the processing module 502, and the DVFS controller 501 can be integrated into the chip 500.

Figure 5:
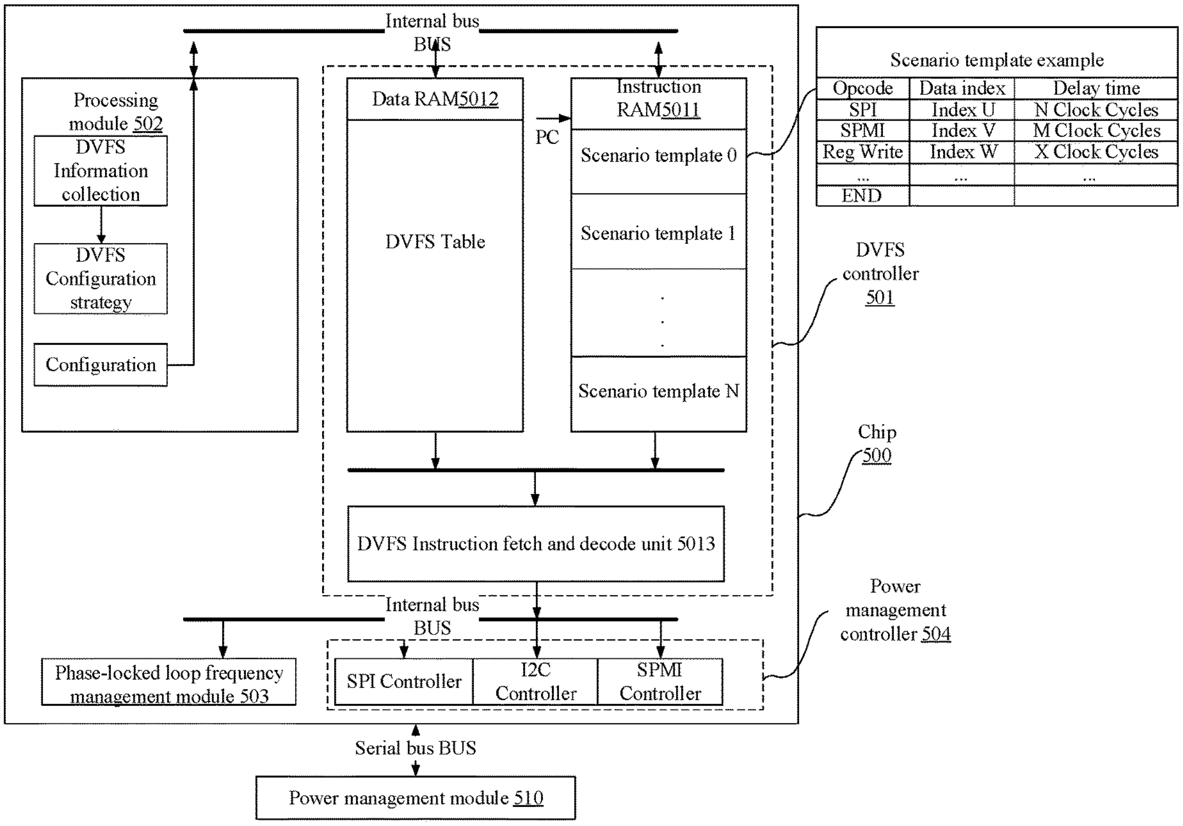
FIG. 5 illustrates a schematic structural diagram of a chip according to some embodiments of the present disclosure.

The first adjustment unit 403 can adjust the frequency of the chip. For example, as shown in FIG. 5, the first adjustment unit 403 receives the frequency control word sent by the DVFS instruction fetch and decode unit 5013 and adjusts the operation frequency of the chip.

Figure 4C:
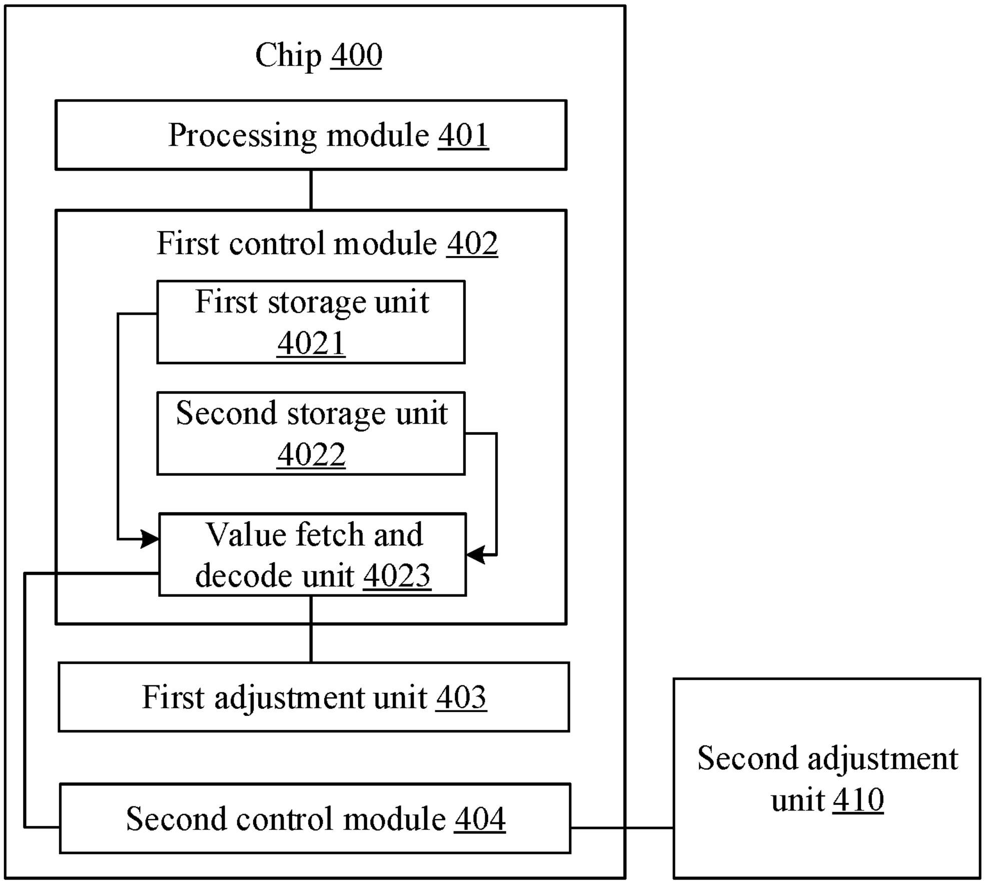
FIG. 4C illustrates a schematic structural diagram of a chip according to some embodiments of the present disclosure.

In some embodiments, as shown in FIG. 4C, the chip 400 further includes a second control module 404. The to-be-controlled target can also include a second adjustment unit 410.

The second control module 404 can be configured to receive the control word sent by the instruction fetch and decode unit 4023, process the control word based on the communication method of the second control module 404 to obtain the control signal, and send the control signal to the second adjustment unit 410. The second adjustment unit 410 can be configured to receive the control signal sent by the second control module 404 and, based on the control signal, control the operation status of the chip.

Here, the second adjustment unit 410 can be different from the first adjustment unit 403 and can be located outside the chip 400. The second adjustment unit 410 can receive the control word sent by the second control module 404 and adjust the operation status of the chip.

For example, as shown in FIG. 5, the second adjustment unit 410 is a power management module 510 located outside the chip 500 and connected to the chip 500 via a serial bus. The second control module can be a power management module controller 504. The power management module 510 can communicate with the internal power management module controller 504 of the chip 500 via a serial bus to receive the voltage control word sent by the power management module controller 504 and adjust the voltage of the chip.

The instruction fetch and decode unit 4023 can be further configured to send the control word to the second control module 404 when the to-be-controlled target is the second adjustment unit 410. The second control module 404 can include at least one controller and control the external second adjustment unit 410 according to the control word through different controllers. The instruction fetch and decode unit 4023 can send the control word to the second control module 404. In some embodiments, the instruction fetch and decode unit 4023 can send the control word to the at least one controller in the second control module 404.

For example, as shown in FIG. 5, the second control module 404 can be a power management module controller 504, including a plurality of controllers, such as a service provider interface controller (SPI Controller), a serial communication protocol controller (I2C Controller), and a power management interface controller (SPMI Controller).

For example, the instruction fetch and decode unit 4023 can fetch a segment 00000101 of the operation instruction from the first storage unit 4021. The high bits 0000 of the operation instruction can be decoded into the operation code SPI, and the low bits 0101 can be decoded into Index U. The voltage control word can be fetched from the storage location Index U of the second storage unit 4022 and sent to the SPI Controller. The SPI Controller can process the voltage control word according to the communication protocol and send the voltage control word to the second adjustment unit 410 outside the chip 400 via the serial bus to control the voltage of the chip.

Embodiments of the present disclosure provide a control method applied to a chip. The method can include determining the target operation status of the chip based on the status information of the chip (S301) and controlling the operation status of the chip based on the predetermined scenario template corresponding to the target operation status (S302).

In some embodiments, the predetermined scenario template can include at least one operation instruction. At S302, controlling the operation status of the chip based on the predetermined scenario template corresponding to the target operation status can include determining the operation instruction corresponding to the target operation status (S3021) and controlling the operation status of the chip based on the operation instruction and the control word corresponding to the operation instruction (S3022).

In some embodiments, each operation instruction can include an operation code and a data index corresponding to the operation code. Each data index can be used to represent the storage location of the control word of the to-be-controlled target. Each operation code can correspond to the control word of the to-be-controlled target and can be used to configure the to-be-controlled target. The method can further include decoding the operation code and the data index, determining the to-be-controlled target based on the decoded operation code, and determining the control word based on the decoded data index and the to-be-controlled target.

In some embodiments, the to-be-controlled target can include a first adjustment unit. The method can further include, when the to-be-controlled target is the first adjustment unit, sending the control word to the first adjustment unit. The first adjustment unit can receive the control word and, based on the control word, control the operation status of the chip.

In some embodiments, the to-be-controlled target can also include a second adjustment unit. The method can further include, when the to-be-controlled target is the second adjustment unit, determining the target communication method for transferring the control word and processing the control word based on the target communication method to obtain the control signal and send the control signal to the second adjustment unit. The second adjustment unit can receive the control signal and control the operation status of the chip based on the control signal.

In some embodiments, each operation instruction can further include a delay time. The delay time can be the wait time between performing each operation instruction and performing the next operation instruction of the operation instruction.

In some embodiments, the predetermined scenario template can further include at least one of the wait instruction, the interrupt instruction, or the termination instruction. The wait instruction can be between different types of operation instructions and can be used to adjust the time sequence of the different types of operation instructions. The interrupt instruction can be after any one of the operation instructions and used to notify the chip that the operation instruction of the scenario template is performed. The termination instruction can be after the interrupt instruction and used to control the chip to stop performing the operation instruction of the scenario template. Embodiments of the present disclosure provide a chip with the first control module as the DVFS controller, the second control module as the power management module controller, the first storage unit as the instruction memory (instruction RAM), the second storage unit as the data memory (Data RAM), the instruction fetch and decode unit as the DVFS instruction fetch and decode unit, the first adjustment unit as the phase-locked loop frequency management (PLL frequency management), and the second adjustment unit as the power management module as an example for description. FIG. 5 illustrates a schematic structural diagram of the chip 500 according to some embodiments of the present disclosure. As shown in FIG. 5, the chip 500 includes the DVFS controller 501, a processing module 502, a phase-locked loop frequency management module 503, and a power management module controller 504. The DVFS controller 501 includes an instruction RAM 5011, a data RAM 5012, and a DVFS instruction fetch and decode unit 5013. The power management module controller 504 can include at least one of the SPI controller, the I2C controller, or the SPMI controller.

Here, the DVFS controller 501 can support serial bus configuration operations such as a register configuration, a service provider interface (SPI), a serial communication protocol controller (I2C), and a power management interface (SPMI) controller. The content of the data RAM can be the control words decomposed according to the DVFS table.

In some embodiments, the software in the processing module 502 can adjust the operation instruction and the control word according to the algorithm. First, the program counter (PC) pointer can configure the starting position of the instruction RAM. Then, the input and output of the DVFS controller can be configured. The DVFS controller can be configured to fetch the operation instruction, decode, and fetch the operation code. Then, the instruction and the data can be converted into the actions configured for the register or the configured time sequence of the serial bus.

For example, in the chip 500 shown in FIG. 5, the processing module 502 uses a DVFS information collection unit to collect the status information of the chip. The DVFS configuration decision unit, according to the collected chip status information, can determine that the load of the system is relatively low. The operation frequency of the chip can be determined according to the target operation frequency after the decision. Then, the voltage of the chip core can be reduced to the target operation voltage to reduce the power consumption of the system.

The software of the processing module 502 can determine the scenario template 0 according to the target operation frequency and the target operation voltage to control the DVFS. The scenario template 0 can be pre-loaded into the instruction RAM 5011 during initialization.

The DVFS controller 501 can start fetching the operation instruction from the determined position in scenario template 0, for example, fetch the first-row instruction from scenario template 0, decode according to the fetched operation instruction to obtain the operation code, and fetch the frequency or the voltage control word from the corresponding storage position IndexU in the data RAM 5012 according to the data index (DATARAM IDX) corresponding to the operation code in the operation instruction. As shown in FIG. 7, when the operation code obtained after decoding is register write (RegWrite), DATARAM IDX can be determined to be 100, and the frequency control word X can be determined to be fetched from the storage address 100 of the data RAM.

The corresponding peripheral device can be configured according to the operation code (OPCODE) of the operation instruction. The processing module 502 can adjust and configure the tempo and time sequence of the power management module by adjusting the delay time (DELAY) between the instructions. The instruction delay time can be typically a plurality of clock cycles. The DVFS controller 501 can notify the processing module 502 (e.g., CPU) through the interrupt instruction (INT) whether the configuration is currently completed during the execution process. Thus, during the process of executing the operation instruction of the scenario template, the processing module may not needed. Therefore, the load of the processing module can be released to participate in other related software tasks in parallel.

Figure 6:
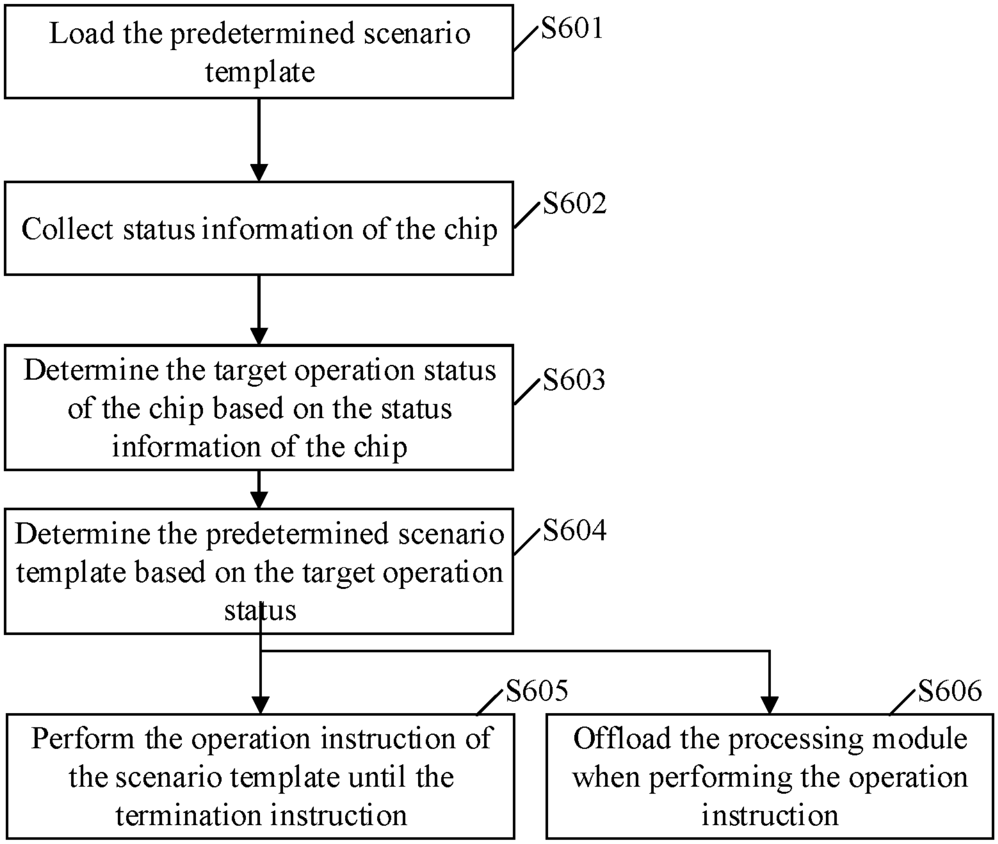
FIG. 6 illustrates a schematic flowchart of a control method according to some embodiments of the present disclosure.

Embodiments of the present disclosure provide a control method. FIG. 6 illustrates a schematic flowchart of the control method according to some embodiments of the present disclosure. As shown in FIG. 6, the method includes the following processes.

At S601, the predetermined scenario template is loaded.

Here, during initialization, preloading scenario templates for different scenarios can save configuration time.

At S602, the status information of the chip is collected.

The status information can be DVFS related information, including the on-board information of the chip and the environment information where the chip is located, e.g., the temperature of the chip, the on-board information such as the current and voltage of the chip in the operation status, and the environment information of the chip such as the temperature of the internal space of the cell phone where the chip is located.

At S603, the target operation status of the chip is determined based on the status information of the chip.

Here, the target operation status can include the target frequency and target voltage of the operation. For example, the current operation frequency of the chip can be lowered to F0, and the current operation current can be lowered to V0. The target frequency and the target voltage of the operation can be the DVFS parameters.

At S604, the predetermined scenario template is determined based on the target operation status.

In some embodiments, if the instruction RAM does not include the scenario template corresponding to the target operation status, the scenario template in the instruction RAM can be modified based on the target operation status. Then, the modified scenario template can be determined as the predetermined scenario template corresponding to the target operation status.

In some other embodiments, if the instruction RAM includes the scenario template corresponding to the target operation status, that scenario template can be determined as the predetermined scenario template corresponding to the target operation status.

For example, the starting PC can be configured by directly using the template in the instruction RAM of the DVFS controller, or a part of the content of the template in the instruction RAM of the DVFS controller can be modified, and the starting PC can be then configured.

At S605, the operation instruction in the scenario template is performed until the termination instruction.

For example, the DVFS controller starts executing subsequent instructions according to the PC address until the END instruction.

At S606, while the operation instruction is performed, the load of the processing module is released.

For example, if the processing module is a central processing unit (CPU), while the operation instruction is performed, the load of the CPU load can be released. CPU utilization can be lowered, and more computational resources can be available for parallel processing of other tasks. Thus, the hardware executing the configuration process can offload the complex operation flow and time required for software configuring the peripheral and lower the CPU Loading. That is, before the CPU detects the termination instruction, the CPU Loading can be lowered, and the execution status of the configuration may not need to be monitored continuously.

Here, Steps S602 to S606 represent the steps of the control method during the chip operation process.

In some embodiments, on one hand, the predetermined scenario template can be preloaded. Thus, the subsequent configuration time of the processing module can be saved by preloading scenario templates including different operation scenarios. On another hand, the content of the configuration part can be realized by the processing module in the combination of the software and hardware of the processing module and the DVFS controller. Thus, the flexibility of the software adjustment can be preserved. On still another hand, the process of the hardware performing the configuration can lower the load of the processing module and offload the computational resources of the processing module, which avoids the complex operation flow and time of the software configuration for the peripheral.

Embodiments of the present disclosure further provide a control apparatus. The control apparatus includes various modules, which can be implemented by the processor of the electronic device or a specific logic circuit. In some embodiments, the processor can include a central processing unit (CPU), a micro processing unit (MPU), a digital signal processor (DSP), or a field programmable gate array (FPGA).

Figure 8:
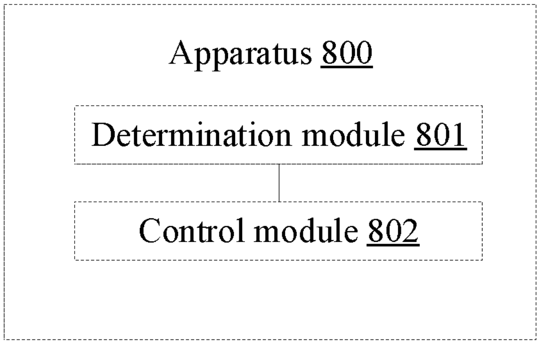
FIG. 8 illustrates a schematic diagram showing an application scene of a control apparatus according to some embodiments of the present disclosure.

FIG. 8 illustrates a schematic diagram showing an application scene of the control apparatus 800 according to some embodiments of the present disclosure. As shown in FIG. 8, the apparatus 800 includes a determination module 801 and a control module 802.

The determination module 801 can be configured to determine, based on the status information of the chip, the target operation status of the chip.

The control module 802 can be configured to control the operation status of the chip according to the predetermined scenario template corresponding to the target operation status.

In some embodiments, the predetermined scenario template can include at least one operation instruction. The control module can be further configured to determine the operation instruction corresponding to the target operation status and, based on the operation instruction and the control word corresponding to the operation instruction, control the operation status of the chip.

In some embodiments, each operation instruction can include an operation code and a data index corresponding to the operation code. Each data index can be used to indicate the storage location of the control word of the to-be-controlled target. Each operation code can correspond to the control word of the to-be-controlled target and can be used to configure the to-be-controlled target. The apparatus 800 can also include a decoding module configured to decode the operation code and the data index. The determination module can be further configured to determine the to-be-controlled based on the decoded operation code and determine the control word based on the decoded data index and the to-be-controlled target.

In some embodiments, the to-be-controlled target can include a first adjustment unit. The apparatus 800 can further include a transmission module configured to send the control word to the first adjustment unit when the to-be-controlled target is the first adjustment unit. The first adjustment unit can receive the control word, and the control module can be further configured to control the operation status of the chip based on the control word.

In some embodiments, the to-be-controlled target can further include the second adjustment unit. The determination module can be further configured to determine the target communication method for transferring the control word when the to-be-controlled target is the second adjustment unit, process the control word based on the target communication method to obtain the control signal to send the control signal to the second adjustment unit, and control the operation status of the chip based on the control signal when the second adjustment unit receives the control signal.

In some embodiments, each operation instruction can further include delay time. The delay time can be the wait time between performing each operation instruction and performing the next operation instruction of the operation instruction.

In some embodiments, the predetermined scenario template can further include at least one of the wait instruction, the interrupt instruction, or the termination instruction. The wait instruction can be between different types of operation instructions and can be used to adjust the time sequence of the different types of operation instructions. The interrupt instruction can be after any one of the operation instructions and used to notify the chip that the operation instruction of the scenario template is performed. The termination instruction can be after the interrupt instruction and used to control the chip to stop performing the operation instruction of the scenario template.

The description of apparatus embodiments are similar to the description of method embodiments and have similar beneficial effects as the method embodiments. For the technical details not disclosed in the device embodiments of the present disclosure, reference can be made to the description of the method embodiments of the present disclosure.

In embodiments of the present disclosure, if the above method is implemented by the software functional module and is sold or used as an independent product, the software functional module can also be stored in a computer-readable storage medium. Based on this understanding, the essence of the technical solution of embodiments of the present disclosure or the part that contributes to the related technology can be embodied in the form of a software product. The computer software product can be stored in a storage medium and includes multiple instructions to cause the electronic device to execute all or a part of the method described in embodiments of the present disclosure. The storage medium can include various media capable of storing program codes, such as a USB drive, an external hard drive, a read only memory (ROM), disks, or optical discs. Thus, embodiments of the present disclosure are not limited to any specific combination of the hardware and software.

Accordingly, embodiments of the present disclosure provide a computer-readable storage medium on which a computer program is stored. When the computer program is executed by a processor, the steps of any one of the methods of embodiments of the present disclosure can be implemented.

Accordingly, embodiments of the present disclosure further provide a chip. The chip includes a programmable logic circuit and/or a program instruction. When the chip is running, the steps of any one of the methods of embodiments of the present disclosure can be realized.

Accordingly, embodiments of the present disclosure provide a computer program product. When the computer program product is performed by the processor of the electronic device, the steps of any one of the methods of embodiments of the present disclosure can be realized.

Figure 9:
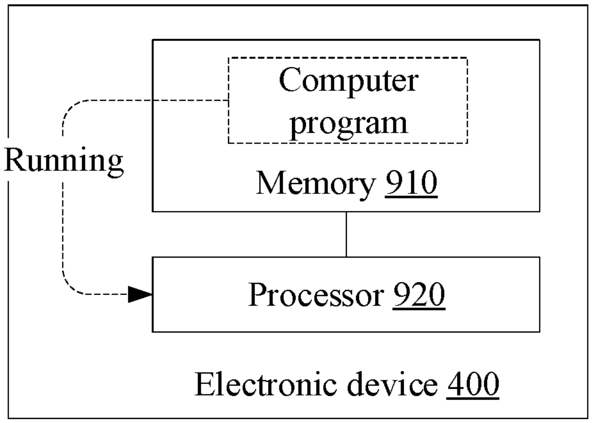
FIG. 9 illustrates a schematic diagram of a hardware entity of an electronic device according to some embodiments of the present disclosure.

Based on the same technical concept, embodiments of the present disclosure provide an electronic device configured to implement the control method of method embodiments of the present disclosure. FIG. 9 illustrates a schematic diagram of a hardware entity of the electronic device 900 according to some embodiments of the present disclosure. As shown in FIG. 9, the electronic device 900 includes a memory 910 and a processor 920. The memory 910 can store a computer program that can run on the processor 920. When the processor 920 executes the program, the steps of any one of the methods of embodiments of the present disclosure can be realized.

The memory 910 is configured to store instructions and applications that can be executed by the processor 920 and cache data to be processed or processed (e.g., image data, audio data, audio communication data, and video communication data) by the processor 920 and the modules of the electronic device. The memory 910 can include flash memory (FLASH) or random access memory (RAM).

The processor 920, when executing the program, can implement the steps of any one of the control methods of embodiments of the present disclosure. The processor 920 can control the overall operation of the electronic device 900.

The processor can include at least one of an application-specific integrated circuit (ASIC), a digital signal processor (DSP), a digital signal processing device (DSPD), a programmable logic device (PLD), a field programmable gate array (FPGA), a central processing unit (CPU), a controller, a microcontroller, or a microprocessor. Other electronic devices capable of implementing the functions of the processor can also be used, which are not limited to embodiments of the present disclosure.

The computer-readable storage medium/memory can include a read only memory (ROM), a programmable read-only memory (PROM), an erasable programmable read-only memory (EPROM), an electrically erasable programmable read-only memory (EEPROM), a ferromagnetic random access memory (FRAM), a flash memory, a magnetic surface storage, an optical disc, or a compact disc read-only memory (CD-ROM). The computer-readable storage medium/memory can also include various electronic devices including one of the memories or any combination thereof, such as a mobile phone, a computer, a tablet, and a personal digital assistant.

The description of the storage medium embodiments and the description of device embodiments are similar to the description of method embodiments and have similar beneficial effects as method embodiments. For the technical details not disclosed in the storage medium and device embodiments of the present disclosure, reference can be made to the description of method embodiments of the present disclosure.

Throughout the specification, the term "an embodiment" or "one embodiment" means that specific features, structures, or characteristics related to embodiments of the present disclosure are included in at least one embodiment of the present disclosure. Therefore, the term "in one embodiment" or "in an embodiment" throughout the specification does not necessarily refer to the same embodiment. Furthermore, the specific features, structures, or characteristics can be combined in any suitable manner in one or more embodiments.

In various embodiments of the present disclosure, the sequence number of the above processes does not necessarily imply a specific execution order. The execution order of the processes should be determined according to the functionality and inherent logic of the processes, which does not limit the implementation process of embodiments of the present disclosure. The sequence number of embodiments of the present disclosure is merely for description and does not indicate superiority or inferiority of embodiments of the present disclosure.

In the present disclosure, the terms "comprise," "include," or any other variations thereof are intended to encompass non-exclusive inclusion, such that processes, methods, articles, or devices comprising a series of elements include not only those elements but also other elements not explicitly listed, or even elements that are inherent to the processes, methods, articles, or devices. When there are no more limitations, an element specified by "comprising a . . . " does not exclude the presence of additional identical elements in the processes, methods, articles, or devices comprising the element.

In some embodiments of the present disclosure, the disclosed devices and methods can be implemented in other methods. The above device embodiments are merely illustrative. For example, the division of the units is merely a logical functional division, and other division methods can be used in actual implementations. For example, a plurality of units or assemblies can be combined or integrated into another system, or some features may be omitted or not executed. In addition, the coupling, direct coupling, or communication connection between the various members shown or discussed can be indirect coupling or communication connection through interfaces, devices, or units and can be electrical, mechanical, or in other forms.

The units described as separate members can or can not be physically separated. The members shown as units can or can not be physical units and can be located in one place or distributed across a plurality of network units. A part or all of the units can be selected as needed to achieve the objectives of the solution of embodiments of the present disclosure.

In addition, various functional units of embodiments of the present disclosure can be all integrated into one processing unit or individual units, respectively, or two or more units can be integrated into one unit. The integrated units can be implemented by hardware or the hardware with the software functional units.

In some other embodiments, when the integrated unit of the present disclosure is implemented in the form of the software functional module and sold or applied as the individual product, the unit can be stored in the computer-readable storage medium. Thus, the essence of the technical solution of embodiments of the present disclosure or the part contributing to the related technology can be embodied as the software product. The computer software product can be stored in a storage medium and include some instructions used to cause the device to automatically measure all or a part of the methods of embodiments of the present disclosure. The storage medium can include a medium capable of storing the program codes, such as a mobile storage device, ROM, disks, or CDs.

The methods disclosed in embodiments of the present disclosure can be combined arbitrarily when there is no conflict to obtain new method embodiments.

The features disclosed in embodiments of the present disclosure can be combined arbitrarily when there is no conflict to obtain new method or device embodiments.

The above are only embodiments of the present disclosure, but the scope of the present disclosure is not limited to this. Those skilled in the art can easily think of modifications and replacements within the technical scope of the present disclosure. These modifications and replacements should be within the scope of the present disclosure. The scope of the present disclosure is subjected to the scope of the claims.

What is claimed is:

1. A chip comprising:

a processing module configured to determine a target operation status of the chip based on status information of the chip; and a first control module configured to control an operation status of the chip based on a predetermined scenario template corresponding to the target operation status;

wherein the first module includes:

a first storage unit configured to store the predetermined scenario template, the predetermined scenario template including at least one operation instruction;

a second storage unit configured to store a control word corresponding to the operation instruction; and an instruction fetch and decode unit configured to read the operation instruction from the first storage unit, read the control word from the second storage unit, and control the operation status of the chip based on the operation instruction and the control word.

2. The chip according to claim 1, wherein the operation instruction further includes:

a data index used to represent a storage location of the control word of a to-be-controlled target in the second storage unit; and an operation code corresponding to the control word of the to-be-controlled target and used to configure the to-be-controlled target.

3. The chip according to claim 2, wherein the instruction fetch and decode unit is further configured to:

decode the operation code and the data index;

determine the to-be-controlled target based on the decoded operation code; and determine the control word read from the second storage unit based on the decoded data index and the to-be-controlled target.

4. The chip according to claim 3, wherein:

the to-be-controlled target includes a first adjustment unit configured to receive the control word sent from the instruction fetch and decode unit and control the operation status of the chip based on the control word; and the instruction fetch and decode unit is further configured to send the control word to the first adjustment unit when the to-be-controlled target is the first adjustment unit.

5. The chip according to claim 3, further comprising:

a second control module configured to receive the control word sent from the instruction fetch and decode unit, process the control word based on a communication method of the second control module to obtain a control signal, and send the control signal to the second adjustment unit;

wherein:

the to-be-controlled target further includes a second adjustment unit configured to receive the control signal sent from the second control module and control the operation status of the chip based on the control signal; and the instruction fetch and decode unit is further configured to send the control word to the second control module when the to-be-controlled target is the second adjustment unit.

6. The chip according to claim 2, wherein the operation instruction further includes delay time, the delay time representing wait time between performing the operation instruction and performing a next operation instruction of the operation instruction.

7. The chip according to claim 2, wherein the predetermined scenario template further includes at least one of a wait instruction, an interrupt instruction, and a termination instruction, wherein:

the wait instruction is between different types of operation instructions and used to adjust a time sequence of the different types of operation instructions;

the interrupt instruction is after any operation instruction and used to notify the processing module that the operation instruction of the scenario template is completed; and the termination instruction is after the interrupt instruction and used to control the first control module to stop performing the operation instruction of the scenario template.

8. A control method applied to a chip comprising:

determining a target operation status of the chip based on status information of the chip; and controlling an operation status of the chip based on a predetermined scenario template corresponding to the target operation status;

wherein:

the predetermined scenario template includes at least one operation instruction; and controlling the operation status of the chip based on the predetermined scenario template corresponding to the target operation status includes:

determining the operation instruction corresponding to the target operation status; and controlling the operation status of the chip based on the operation instruction and a control word corresponding to the operation instruction.

9. The method according to claim 8, wherein the operation instruction includes:

a data index used to represent a storage location of the control word of a to-be-controlled target in the second storage unit; and an operation code corresponding to the control word of the to-be-controlled target and used to configure the to-be-controlled target.

10. The method according to claim 9, wherein controlling the operation status of the chip based on the predetermined scenario template corresponding to the target operation status further includes:

decoding the operation code and the data index;

determining the to-be-controlled target based on the decoded operation code; and determining the control word read from the second storage unit based on the decoded data index and the to-be-controlled target.

11. The method according to claim 10, wherein determining the control word read from the second storage unit based on the decoded data index and the to-be-controlled target includes:

receiving the control word and controlling the operation status of the chip based on the control word.

12. The method according to claim 10, further comprising:

receiving the control word; and processing the control word to obtain a control signal.

13. The method according to claim 9, wherein the operation instruction further includes delay time, the delay time representing wait time between performing the operation instruction and performing a next operation instruction of the operation instruction.

14. The method according to claim 9, wherein the predetermined scenario template further includes at least one of a wait instruction, an interrupt instruction, and a termination instruction, wherein:

the wait instruction is between different types of operation instructions and used to adjust a time sequence of the different types of operation instructions;

the interrupt instruction is after any operation instruction and used to notify the processing module that the operation instruction of the scenario template is completed; and the termination instruction is after the interrupt instruction and used to control the first control module to stop performing the operation instruction of the scenario template.

15. An electronic device comprising:

a processor; and a memory storing a computer program that, when executed by the processor, causes the processor to perform the method according to claim 8.

16. The device according to claim 15, wherein the processor is further configured to:

store the predetermined scenario template, the predetermined scenario template including at least one operation instruction;

store a control word corresponding to the operation instruction; and read the operation instruction and the control word and control the operation status of the chip based on the operation instruction and the control word.

* * * * *